United States Patent [19]

de Groot et al.

[11] Patent Number: 5,135,307

[45] Date of Patent: Aug. 4, 1992

[54] LASER DIODE INTERFEROMETER

[75] Inventors: Peter J. de Groot, Bethel; Gregg M. Gallatin, Monroe; George Gardopee, Southburg, all of Conn.

[73] Assignee: Hughes Danbury Optical System, Inc., Danbury, Conn.

[21] Appl. No.: 530,692

[22] Filed: May 30, 1990

[51] Int. Cl.$^5$ ............................................. G01B 11/30
[52] U.S. Cl. .................................... 356/359; 356/125; 356/445
[58] Field of Search ............... 356/359, 124, 125, 127, 356/445, 446, 447, 448; 359/577

[56] References Cited

PUBLICATIONS

"Laser Diode Feedback Interferometer for Stabilization and Displacement Measurements" by T. Yoshino, M. Nara, S. Mnatzakanian, B. S. Lee and T. C. Strand, Applied Optics 26, 892 (1989).

Primary Examiner—Samuel A. Turner
Assistant Examiner—LaCharles P. Keesee, II
Attorney, Agent, or Firm—W. K. Denson-Law; W. J. Streeter; R. A. Hays

[57] ABSTRACT

A laser system for measuring dimensional aberrations across a target surface includes a laser diode for producing a diverging beam of laser emission. A mask spaced from the diode in the beam has an aperture therein and can be moved so as to translate the aperture to selected locations laterally with respect to the beam. The mask blocks emission from impinging on the target except for emission transitting the aperture. Emission reflected from a segment to the target returns through the aperture back into the laser diode. An AC current is added to the driver current to modulate the emission. A lock-in amplifier of a photodetector signal adds feedback current to the driver current to lock in phase angle, so that the feedback current is a measure of the aberrations.

17 Claims, 2 Drawing Sheets

LASER DIODE INTERFEROMETER

This invention relates to interferometry and particularly to a laser diode interferometer system for measuring dimensional aberrations laterally across an optical surface.

BACKGROUND OF THE INVENTION

In the field of optics it is very important that optical surfaces such as on lenses and mirrors conform to a required shape. For example a spherically concave mirror typically used in precision telescopes should have as little surface aberration as practical. Controlled grinding and finishing procedures are indispensable, but measurement for unacceptable aberrations is also necessary.

Techniques based on interferometry are used for detecting aberrations or mapping contours of a surface. These are based on combining optical waves so as to cause reinforcement or cancellation of optical power depending on phase differences between the waves. In a conventional application of the principles to measuring optical surfaces such as in Michelson interferometry, a beam is split into a reference beam and a second beam that is reflected from the test surface, so that the recombined beam has a standing wave pattern displayed as fringes representing the surface shape. Variations in the pattern are associated with surface aberrations. However, it is complicated to generate actual dimensional data from the fringes for the aberrations. Further, the optical system of conventional interferometers is complex and difficult to align.

The advent of lasers introduced coherent light and a corresponding capability for higher optical precision. As summarized in an article "Laser Diode Feedback Interferometer for Stabilization and Displacement Measurements" by T. Yoshino, M. Nara, S. Mnatzakanian, B. S. Lee and T. C. Strand, Applied Optics 26, 892 (1989), laser diodes are particularly useful because of stability, frequency tunability, low power, compact size and low cost. The article discloses an effect of self coupling such a laser to an external reflector so that the laser emission is altered by the reflection. A technique for incorporating detection of laser power into a feedback loop to lock in the phase angle of the emission, and display feedback current as a measure of linear displacement of the reflector, is also disclosed therein.

SUMMARY OF THE INVENTION

An object of the present invention is to provide an improved laser system for measuring dimensional aberrations across a target surface. A further object is to provide a novel laser system for scanning an optical surface to generate dimensional information on surface aberrations, or for mapping contours of a surface.

The foregoing and other objects are achieved with a laser system comprising a laser diode receptive of a DC driver current for producing a beam of laser emission having a phase angle, and detector means for detecting the phase angle or other selected phase-dependent characteristic. The system further comprises a mask spaced from the diode in the diverging beam and having an aperture therein, and translation means for moving the mask so as to translate the aperture to selected locations laterally with respect to the beam. The mask is disposed to block emission from impinging on a laterally extended target surface except for emission transmitting the aperture. The mask also is disposed so that a portion of transmitting emission reflected from a segment of the target surface returns through the aperture back into the laser diode whereby differences in optical path length of returning emissions for the selected locations correspond to dimensional aberrations across the target surface, with the selected characteristic being representative of the path length so that detection of the phase angle or other selected phase-dependent characteristic for the selected locations provides a measure of the aberrations.

An objective lens preferably is disposed between the laser diode and the mask so as to image the laser diode at a focal point between the objective lens and the mask. The system is especially suited for a target surface that is a concave surface having an average radius of curvature from a center point positioned proximate the focal point, but other surfaces may be used with a weak positive lens positioned at the aperture. In one embodiment the mask is disposed proximate the target surface, and the aperture has an opening having a selected size for the segment of the target surface. In another embodiment the mask is disposed approximately midway between the laser diode and the target surface, and the objective lens is disposed at the aperture so as to image the laser diode substantially at the target surface.

For obtaining measurements, the system advantageously comprises modulation means for introducing a frequency modulation into the emission. The detector means comprises a photodetector responsive to the emission for generating a signal proportional to the optical power, amplifier means for amplifying the signal into a feedback current, feedback means for adding the feedback current to the driver current so as to lock in the phase angle whereby the feedback current is proportional to the path length, and output means receptive of the feedback current for presenting an output signal proportional thereto as a measure of the aberrations. Preferably the modulation means comprises an AC generator for adding an AC current to the DC current driver.

DETAILED DESCRIPTION OF THE INVENTION

Figure 1:
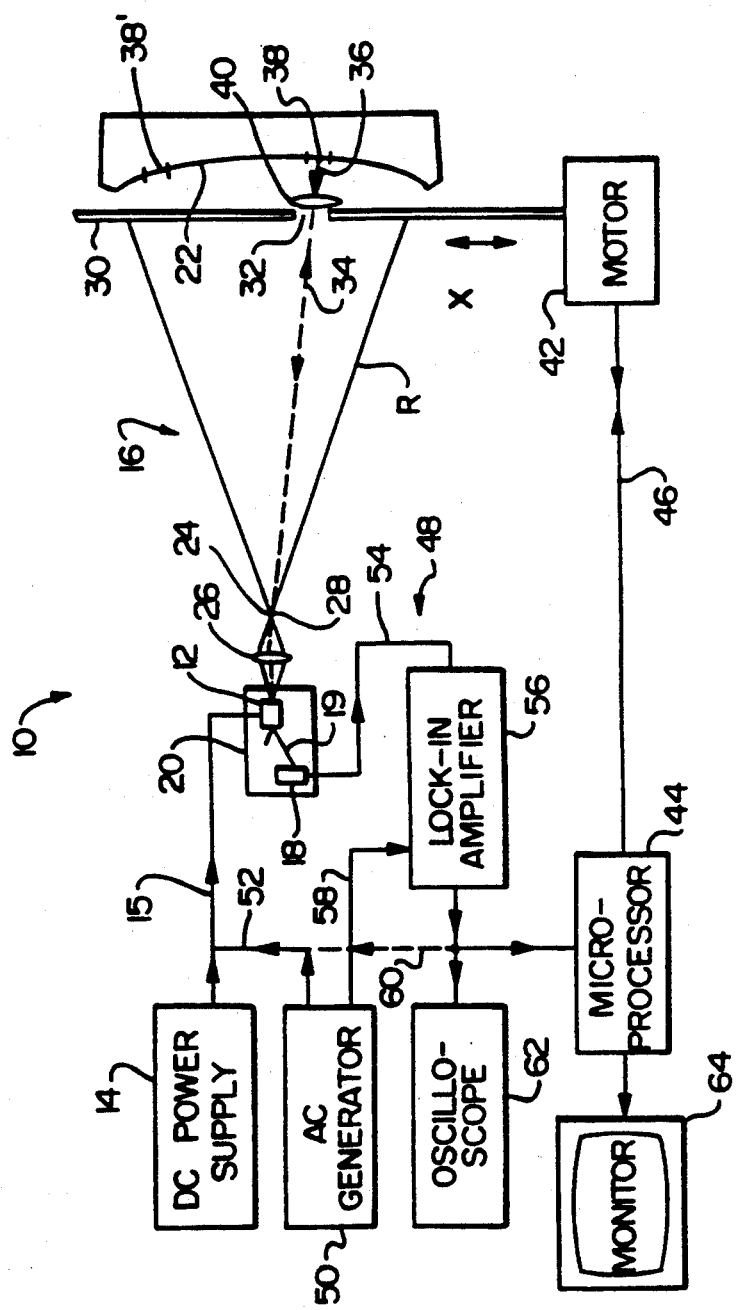
FIG. 1 is a schematic drawing of a laser system according to an embodiment of the invention.

With reference to FIG. 1, a laser system 10 includes a semiconductor laser diode 12 with an associated power supply 14 for providing DC current on a line 15 to the diode to generate laser emission 16. The diode is a conventional single-mode type, such as a Sharp LT015MDO operated at 830 nm from a DC current of 80 ma and having an output power of 30 mW. The emission is directed as a diverging beam, generally toward the right in the drawing. A pin photodiode detector 18 for the emission 19 from the back of the diode is conventionally included in the diode package 20 and provides an output signal proportional to the optical power.

The diverging beam 16 is directed towards a target surface 22 for which surface information is desired. Of particular interest, in the use of the invention, is measuring small aberrations in the surface of a target which is an optical surface such as a concave mirror (with or without silvering applied yet) or an optical flat. Such information is required, typically, for detecting imperfections in the surface so that the surface may be accepted, rejected or returned for further finishing. The target surface 22 in the example of FIG. 1 is a spherically concave mirror having an average radius of curvature R from a center point 24. As an example R is 110 cm and the mirror 22 is 10.5 cm diameter.

It is advantageous to place an objective lens 26 in the beam to improve optical collection efficiency. In FIG. 1 this lens is shown disposed proximate the laser diode 12 so as to image the diode to a focal point 28, preferably with the lens approximately midway between the focal point and the diode. The apparatus is then positioned so that the center point 24 for the mirror is proximate the focal point 28, and preferably substantially coincidental therewith. The lens, for example is 10 mm focal length and 0.4 numerical aperture. The lens thus passes the laser beam diverging from the focal point toward the target.

A mask 38 is spaced from the laser diode 12 in the diverging beam 16 and has an aperture 32 therein. The mask is disposed so as to block the diverging beam from impinging on the target surface 22 except for a portion of emission 34 transmitting the aperture. In the embodiment of FIG. 1, the mask is disposed proximate the target surface, and the aperture 32 has a relatively small size such as 2 m so that only the small portion 34 of the diverging beam 16 is incident on the target 22. At least a portion 36 of the transmitting beam is reflected from a similar selected size segment 38 of the target surface back through the aperture to the diode 12.

Although unnecessary for a spherical target, which naturally reflects emission back through the aperture, it is advantageous to place a weak positive lens 40 at the aperture 32. This lens, for example having a 0.5 m focal length, can collect reflected emission for a non-spherical surface such as an optical flat that interjects a severe wavefront tilt. Generally the weak lens should have a focal length between about 1 and 10 times the overall length of the optical system, i.e. distance between the diode and the target. With such a lens, sufficient reflected emission may be returned back through the aperture.

Further according to the invention, translation means are provided for moving the mask so as to translate the aperture to selected locations laterally with respect to the beam. This is effected with a pair of motorized micrometers 42 (one shown in FIG. 1) set orthogonally to translate the mask 30 and its aperture 32 along x- and y- axes in a two-dimensional pattern of selected locations over the target surface. The x-axis is shown in the figure; the y-axis is perpendicular to the plane of the figure. Conveniently a microprocessor 44 is programmed to provide signals on a line 46 to the motors 42 for positioning the aperture as desired and relating positions to information generated for each position. For example the aperture may be scanned across the surface in the x- direction, stepped a y-increment, scanned again, and so forth over the surface. Steps and measurements need not cover the entire surface, e.g. 1 mm increments for the selected locations may be sufficient. Two selected locations are shown at 38 and 38' in FIG. 1.

The returned emission operates as an optical feedback to alter the emission coherently. The power output of the laser sensitive to the relative phase angle of the returned emission and thus to the exact path length to the mirror and back, in the manner of an interferometer. Detection of this phase angle or other phase-dependent characteristic, and particularly any changes thereof, provides a measure of the exact path length for each of the selected locations for the aperture and, therefore, a measure of aberrations across the mirror surface.

Advantageously a detector an electronic feedback system 48 is utilized to facilitate measurement of the optical path, in the manner taught in the aforementioned article by Yoshino et al.

One phenomenon to utilize is phase angle dependence on the optical frequency as well as on the path length; for small changes phase angle changes according to the formula $2\pi(f\delta L + L\delta f)/c$ where f is optical frequency, L is path length and c is light velocity. Another characteristic of the emission, namely frequency or power or a representative signal thereof any be selected as a measure of phase angle and detected for measuring the aberrations. Modulation of the emission and a negative feedback loop are utilized in the detector system 48 to effect the measurement. A modulation means, such as an AC function generator 50 for adding an AC current to the driver current on line 15 via line 52, introduces into the emission a constant frequency modulation (i.e. a cyclic $\delta f$), for example a sinusoidal modulation at 100 kHz and 0.1 MA.

The photodetector 18 is responsive to the emission to generate a signal onto line 54 proportional to the laser output power. A lock-in amplifier 56 receive a reference signal on line 58 from the AC generator 50, and amplifies and outputs the AC amplitude of the signal into a feedback current. Gain is, for example about 1000. The feedback current is added via line 60 to the driver current on line 15. The feedback will lock in the phase angle, in such a manner that the feedback current is proportional to the path length.

Output means such as the microprocessor 44 and/or an oscilloscope 62 are receptive of the feedback current for presenting an output signal proportional thereto as a measure of the aberrations. The microprocessor can relate mask position to the output signal and display the positional aberration information on a monitor 64. The microprocessor may also be programmed to compensate for a regular deviation in path length from that of a spherical reflector, for example for an optical flat.

Other signals derived readily from detection of an optical frequency-dependent parameter (viz. optical frequency or laser power) may be used for the measure of aberrations. Optical frequency may be detected to produce the signal used for feedback current; however emission power is generally more convenient to detect.

Figure 2:
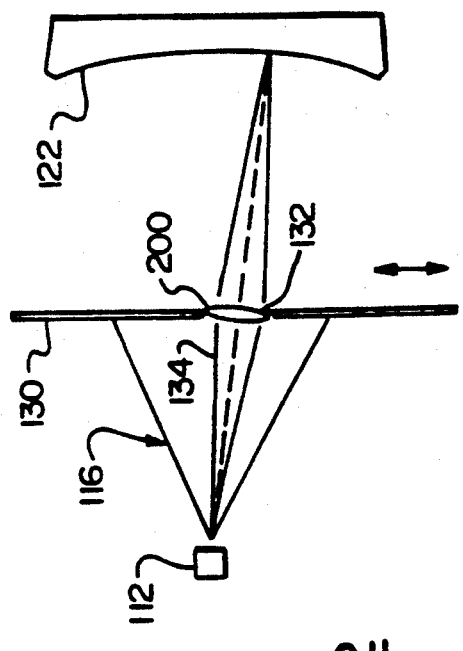
FIG. 2 is a schematic drawing of a portion of a laser system according to a further embodiment of the invention.

FIG. 2 shows another embodiment with regard to placement of the mask. In this case the mask 130 is disposed in the diverging beam 116 approximately midway between the laser diode 112 and the target surface 122. This embodiment also comprises an objective lens 200 disposed at the aperture 132 so as to image the laser diode substantially at the target surface. The aperture is larger than that of FIG. 1, to accommodate the lens and allow a larger portion 134 of the diverging beam to pass through to increase collection efficiency and sensitivity. Other components and operation are otherwise substantially the same as described for FIG. 1. This embodiment has accommodate 25 microns/mm of surface slope with a measurement accuracy of 100 nm at a distance of approximately 20 cm.

Generally the mask should be located between about the midway point (FIG. 2), and near the target surface (FIG. 1), with preferences being for either end of the range. When midway is used, (FIG. 2) it was found that the mask should be located as close to the midpoint as practical.

The foregoing apparatus may be seen to have the advantage of providing for two-dimensional scanning of an optical surface for highly accurate interferometric information, without re-orienting the whole apparatus; only the mask with its aperture and lens is moved. Dimensional deviations or contour mapping of a surface are provided directly, as numerical date related directly to position of the aperture on the surface. Complex interpretations of two-dimensional fringes as for ordinary interferometry is not necessary. It may be seen that the system is particularly useful for determining aberrations for a concave spherical reflector, and the system is simple and easy to align.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A laser system for measuring dimensional aberrations across a target surface, comprising a laser diode for producing a diverging beam of laser emission having a selected phase-dependent characteristic, detector means for detecting the selected characteristic, a mask spaced from the diode is the diverging beam and having an aperture therein, and translation means for moving the mask so as to translate the aperture to selected locations laterally with respect to the beam, the mask being disposed to block emission from impinging on a laterally extended target surface except for emission transmitting the aperture, and the mask being further disposed so that a portion of transmitting emission reflected from a segment of the target surface returns through the aperture back into the laser diode whereby differences in optical path length of returning emission for the selected locations correspond to dimensional aberrations across the target surface, with the selected characteristic being representative of the path length so that detection of the selected characteristic for the selected locations provides a measure of the aberrations.

2. The system according to claim 1 further comprising an objective lens disposed between the laser diode and the mask so as to image the laser diode at a focal point between the objective lens and the mask.

3. The system according to claim 2 wherein the objective lens is disposed approximately midway between the laser diode and the focal point.

4. The system according to claim 2 wherein the target surface is a concave surface having an average radius of curvature from a center point positioned proximate the focal point.

5. The system according to claim 2 further comprising a weak positive lens positioned at the aperture.

6. The system according to claim 2 wherein the mask is disposed proximate the target surface, and the aperture has an opening of a selected size for the segment of the target surface.

7. The system according to claim 1 wherein the mask is disposed proximate the target surface, and the aperture has an opening of a selected size for the segment of the target surface.

8. The system according to claim 1 wherein the mask is disposed between the target surface and a location approximately midway between the laser diode and the target surface.

9. The system according to claim 8 further comprising an objective lens disposed at the aperture so as to image the laser diode substantially at the target surface.

10. The system according to claim 9 wherein the mask is disposed approximately midway between the laser diode and the target surface.

11. The system according to claim 1 wherein the selected characteristic consists of relative phase angle, optical frequency or optical power of the emission.

12. The system according to claim 11 wherein the selected characteristic consists of the relative phase angle.

13. The system according to claim 1 wherein the selected characteristic is an optical frequency-dependent parameter, the system further comprises modulation means for introducing a frequency modulation into the emission, the detector means comprises feedback means responsive to the modulation means and the emission for locking in the phase angle so that the optical parameter is proportional to the path length, and the system further comprises output means respective of the optical parameter for presenting an output signal proportional thereto as a measure of the aberrations.

14. The apparatus according to claim 13 wherein the optical parameter consists of optical frequency or optical power of the emission.

15. The system according to claim 14 further comprising a power supply for providing a DC driver current to the laser diode, and wherein the modulation means comprises an AC generator for adding an AC current to the driver current.

16. The system according to claim 1 wherein the selected characteristic is an optical power of the emission, the system further comprises power supply means for providing a DC driver current to the laser diode to generate the emission, and modulation means for introducing into the emission a frequency modulation, and the detector means comprises photodetector means responsive to the emission for generating a signal proportional to the optical power, lock-in amplifier means responsive to the modulation means for amplifying the signal into a feedback current, feedback means for adding the feedback current to the driver current so as to lock in the phase angle whereby the feedback current is proportional to the path length, and output means receptive of the feedback current for presenting an output signal proportional thereto as a measure of the aberrations.

17. The system according to claim 16 wherein the modulation means comprises an AC generator for adding an AC current to the driver current.

* * * * *